(12) United States Patent
Haag et al.

(10) Patent No.: US 7,848,227 B2
(45) Date of Patent: Dec. 7, 2010

(54) RETRANSMIT TIMEOUT SUPPRESSION IN LARGE SCALE NETWORKS

(75) Inventors: Jeffrey D. Haag, Raleigh, NC (US);
Craig J. Fox, Deerfield, NH (US)

(73) Assignee: Cisco Technology, Inc., San Jose, CA (US)

( * ) Notice: Subject to any disclaimer, the term of this patent is extended or adjusted under 35 U.S.C. 154(b) by 831 days.

(21) Appl. No.: 11/043,223

(22) Filed: Jan. 26, 2005

(65) Prior Publication Data

US 2006/0187823 A1 Aug. 24, 2006

(51) Int. Cl.
*G01R 31/08* (2006.01)
*H04L 12/28* (2006.01)

(52) U.S. Cl. .............. 370/218; 370/229; 370/231; 370/235; 370/236; 370/351; 370/392

(58) Field of Classification Search ........... 370/229, 370/231, 218, 351, 392, 235, 236
See application file for complete search history.

(56) References Cited

U.S. PATENT DOCUMENTS

| 6,675,208 | B1 * | 1/2004 | Rai et al. ............. 709/224 |
| 7,035,214 | B1 * | 4/2006 | Seddigh et al. ........ 370/231 |
| 7,085,273 | B1 * | 8/2006 | Chuah ................. 370/394 |
| 7,149,224 | B1 * | 12/2006 | Krishnamurthy ....... 370/401 |
| 2005/0043028 | A1 * | 2/2005 | Suomi ................ 455/435.1 |
| 2005/0047333 | A1 * | 3/2005 | Todd et al. ........... 370/229 |
| 2005/0083963 | A1 * | 4/2005 | Holeman, Sr. ......... 370/447 |
| 2006/0002358 | A1 * | 1/2006 | Ray et al. ............ 370/342 |
| 2006/0031588 | A1 * | 2/2006 | Sen et al. ............ 709/248 |
| 2007/0121661 | A1 * | 5/2007 | Ohta et al. ........... 370/412 |

OTHER PUBLICATIONS

Samuel J. Leffler, Robert S. Fabry, Wiliam N. Joy, Phil Lapsley, "An Advanced 4.4BSD Interprocess Communication Tutorial," Computer Systems Research Group, Department of Electrical Engineering and Computer Science, PSD:21-1 thru PSD 21-10.
C. Rigney et al., "RFC 2865—Remote Authentication Dial In User Service (RADIUS)," Copyright © The Internet Society, Jun. 2000, pp. 1-76.
W. Simpson, "RFC 1661—The Point-to-Point Protocol (PPP)," Daydreamer, Jul. 1994, pp. 1-50.

* cited by examiner

*Primary Examiner*—Daniel J Ryman
*Assistant Examiner*—John Blanton
(74) *Attorney, Agent, or Firm*—Campbell Stephenson LLP; Jonathan N. Geld

(57) ABSTRACT

A method, apparatus, and network communication node for suppressing transmission of a request packet, in the context of a request-response network protocol, if a packet in response to a currently pending request packet is present in an input process queue in a network communication node are presented. One embodiment of the present invention provides this capability by pre-processing an incoming packet to determine whether the packet is designated as being in response to a pending request.

30 Claims, 7 Drawing Sheets

200

| Code 210 | Identifier 220 | Length 230 |
|---|---|---|
| Options 240 ||||

Figure 2

RETRANSMIT TIMEOUT SUPPRESSION IN LARGE SCALE NETWORKS

FIELD OF THE INVENTION

The field of this invention relates to data transmission systems. Specifically, a method is presented to prevent retransmission of request packets by a router when a responsive packet to a previous request packet is in a queue awaiting processing.

BACKGROUND OF THE INVENTION

The ready ability for a business to store, process and to transmit data is a facet of operations that a business relies upon to conduct its day-to-day activities. For businesses that increasingly depend upon data for their operations, an inability to store, process, or transmit data can hurt a business' reputation and bottom line. Businesses are therefore taking measures to improve their ability to store, process, and transmit data, and to more efficiently share the resources that enable these operations.

The ever-increasing reliance on data and the computing systems that produce, process, distribute, and maintain data in its myriad forms continues to put great demands on techniques for data communication. As a business' data network grows, the business' reliance upon the functionality of that data network grows as well. Growth in a data network occurs as the business grows and as computing needs increase.

As a data network increases in size, both the amount and types of traffic supported by the network increase. Different computing systems can use different kinds of network protocols to talk with one another and certain protocols are more appropriate for particular types of network interactions. As a data network increases in size, the network can be subdivided into smaller, more easily manageable sub-networks that communicate with one another via network communication nodes such as bridges, routers, network access servers, and network concentrators. A network's capacity to handle the amount of traffic it is expected to support is generally carefully monitored because exceeding a network's bandwidth can slow the systems supported by the network and hinder a business' ability to conduct its operations.

Network protocols have been developed that use a series of requests and responses during a process of establishing a network connection between two or more nodes on the network. During this request-response phase of establishing a connection, configuration data can be exchanged between the network nodes along with responses to such configuration information indicating whether such a configuration is acceptable to a network node. Protocols having an exchange of requests and responses also associate a timer with a particular request packet so that should a response not be received in a set time (e.g., due to network congestion or a lost packet) a new request packet will be sent to avoid a system stalling in the process of establishing a connection. Examples of network protocols that incorporate a request-response configuration phase are the point-to-point (PPP) protocol, the remote authentication dial-in user service (RADIUS) protocol, and Unix inter-process communication (IPC) protocol.

FIG. 1 is a state diagram of a PPP network connection and is presented as an aid to understanding the use of a request-response phase for configuration of a network link. A dead state 110 is the state in which a network link starts and ends in PPP. PPP is a peer-to-peer network protocol in which an originating node attempts to establish a connection with a remote peer node. Detection of a carrier signal at the remote peer node transitions the link to proceed to the next state (i.e., the link is "up").

The next state is link establishment 120, wherein a first exchange of request-response configuration packets occurs. In PPP, link establishment packets are called link control protocol (LCP). An originating node transmits a configuration request (Configure-Request) packet to the remote node and then waits for a responsive packet from the remote node before proceeding with the connection.

FIG. 2 illustrates a typical PPP packet used in the link establishment state. PPP packet 200 includes (i) a code 210 identifying the packet (e.g., as a Configure-Request), (ii) an identifier field 220 to aid in matching requests and replies, (iii) a length field 230 indicating the length of the Configure-Request packet, and (iv) a list of configuration options 240 that the originating node desires to negotiate for the connection.

Once the remote peer node receives a Configure-Request packet, the remote peer node can then send a response to the request. The response can take the form of an acknowledgement (Configure-Ack), a non-acknowledge (Configure-Nak), or a rejection (Configure-Rej). Identification of the type of responsive packet is provided in code field 210. Since the requesting node must wait for a response before proceeding with the configuration of the network connection, a timer is started upon the transmission of the request. The timeout period is configurable dependent upon the implementation in which the protocol is being used. Once a timeout period is reached, the originating node sends a new Configure-Request packet and the timer will restart. In some network protocol implementations, there can also be an associated maximum number of such retries that a node will attempt before giving up on a connection. In certain network protocol implementations, in order for a link to be successfully established, an acknowledgement packet must be received with an appropriate identifier and a reiteration of the configuration options as sent by the originating node in the request packet.

Once a link is established, PPP can go to an authentication state 130. This is an optional state in which authentication information can be exchanged between the nodes, including, for example, an exchange of passwords.

Once a link is established, and optionally authenticated, the link enters a network layer protocol state 140. This is another state in which request-response configuration packets are exchanged. In this state, the configuration packets are called network configuration protocol (NCP) packets. Requests and responses are exchanged between the nodes to establish the network layer protocol that will be encapsulated within exchanged PPP packets. The exchange of request and response packets in this state is similar to that in establishment state 120, and the format of packets is similar to that presented in FIG. 2. The final state occurs when it is desired to terminate the link between the nodes. The link then enters a link termination state 150. An exchange of terminate-request and terminate-acknowledgement packets is made between the nodes and the link is taken down.

Network communication nodes such as routers and network concentrators can handle communications between segments of a large network. Such a network communication node can be responsible for establishing and providing tens of thousands of network connections.

FIG. 3 is a block diagram illustrating such a network communication node. In this depiction, network communication node 300 includes a number of line cards (line cards 302(1)-(N)) that are communicatively coupled to a forwarding engine 310 and a processor 320 with a processor input queue 325 via a data bus 330 and a result bus 340. Line cards 302(1)-(N) include a number of port processors 350(1,1)-(N, N) that are controlled by port processor controllers 360(1)-(N). It will also be noted that forwarding engine 310 and processor 320 are not only coupled to one another via data bus 330 and result bus 340, but are also communicatively coupled to one another by a communications link 370.

When a packet is received, the packet is identified and analyzed by a network communication node such as network communication node 300 in the following manner, according to embodiments of the present invention. Upon receipt at a port, a packet (or some or all of its control information) is sent from one of the port processors 350(1,1)-(N,N) corresponding to the port at which the packet was received to one or more of the those devices coupled to the data bus 330 (e.g., others of port processors 350(1,1)-(N,N), forwarding engine 310, or processor 320 via processor input queue 325). Packet processing according to the present invention can be performed, for example, by a process running on processor 320 on packets stored in processor input queue 325.

In addition, or alternatively, once a packet has been identified for processing according to the present invention, forwarding engine 310, processor 320, or the like, can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

In a network using protocols that incorporate request-response packets, such as PPP, there can be many thousands of requests pending the exchange of responsive packets. Network communication nodes typically have one process designated to process all incoming packets (e.g., processor 320), which include packets responsive to pending requests. As incoming packets arrive at the network communication node, the incoming packets are queued for packet processing by the designated process (e.g., in processor input queue 325).

Due to a potentially large number of pending requests in a large-scale network and therefore a corresponding potentially large number of responsive packets enqueued for packet processing, a response timer for a request can time out before an enqueued response packet can rise to the top of the processor input queue. When this happens, a subsequent request packet can be transmitted with a new identifier to the remote peer node. Thus, when the enqueued responsive packet is ultimately processed by the packet processor, the responsive packet will have a stale identifier and will be rejected. The remote peer node will now respond to the second request packet. But since the second response packet will be put at the end of the input queue, the packet processor may not process the second response packet until after the response timer has timed out for this second request, and therefore a third request will be sent out. In such a scenario, it can be seen that under certain high load conditions, an input queue may never be drained and will continue to expand. It is therefore desirable to provide a means to avoid retransmission of a currently pending request if a packet responsive to the request is present in the input queue.

BRIEF DESCRIPTION OF THE DRAWINGS

The present invention may be better understood, and its numerous objects, features and advantages made apparent to those skilled in the art by referencing the accompanying drawings.

FIG. 2 illustrates a typical PPP packet as used in a link establishment state.

DETAILED DESCRIPTION

Embodiments of the present invention provide a means to suppress transmission of a request packet, in the context of a request-response network protocol, if a packet in response to a currently pending request packet is present in an input process queue in a network communication node. One aspect of the present invention provides this capability by pre-processing an incoming packet to determine whether the packet is designated as being in response to a pending request.

In a request-response network protocol, such as PPP, RADIUS, or IPC, a request packet contains an identifier so that the request and a response to the request can be matched. Typically, in order to accomplish this matching, a response packet will have an identifier field (e.g., 220) containing an identifier that matches an identifier in the corresponding request packet. It can be determined whether a packet responsive to a specific request packet has been received and placed in an incoming queue, if the identifier field of the responsive packet is analyzed by a preprocessor prior to insertion in the incoming queue.

Figure 1:
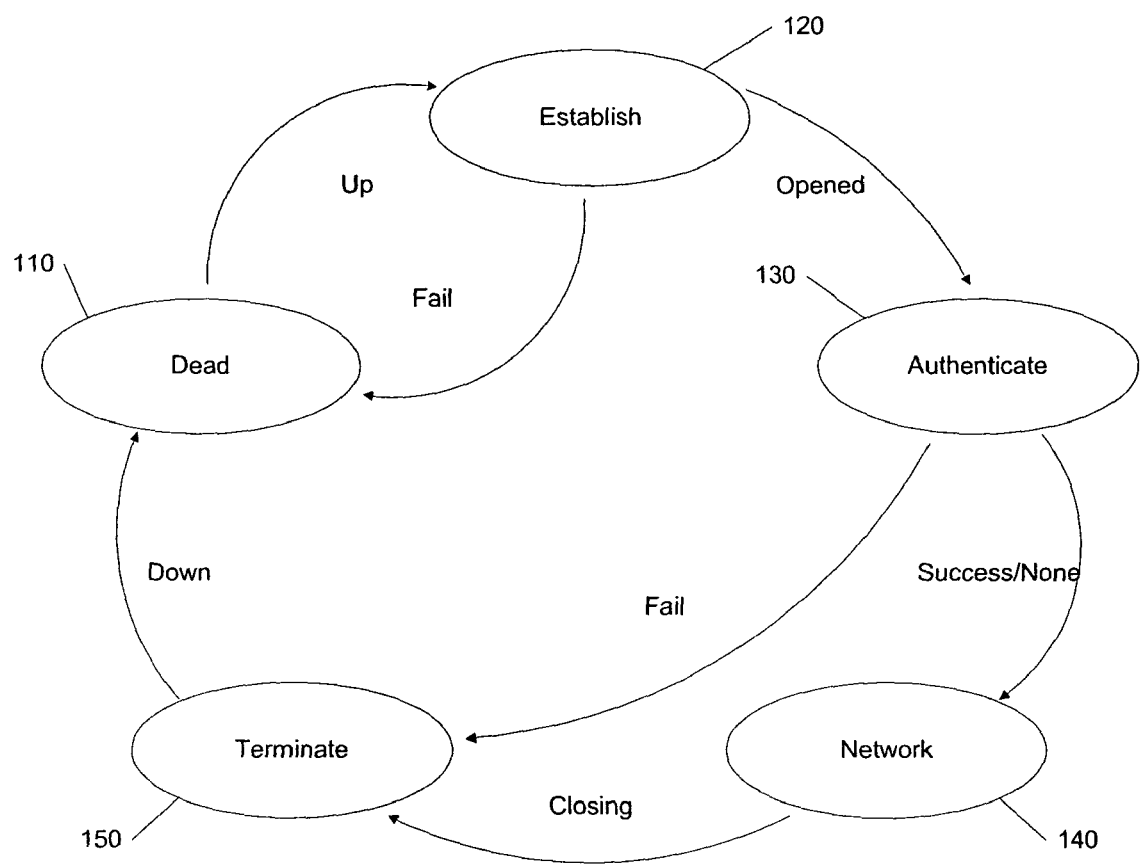
FIG. 1 is a simplified state diagram of the phases of a PPP network connection.
Figure 3:
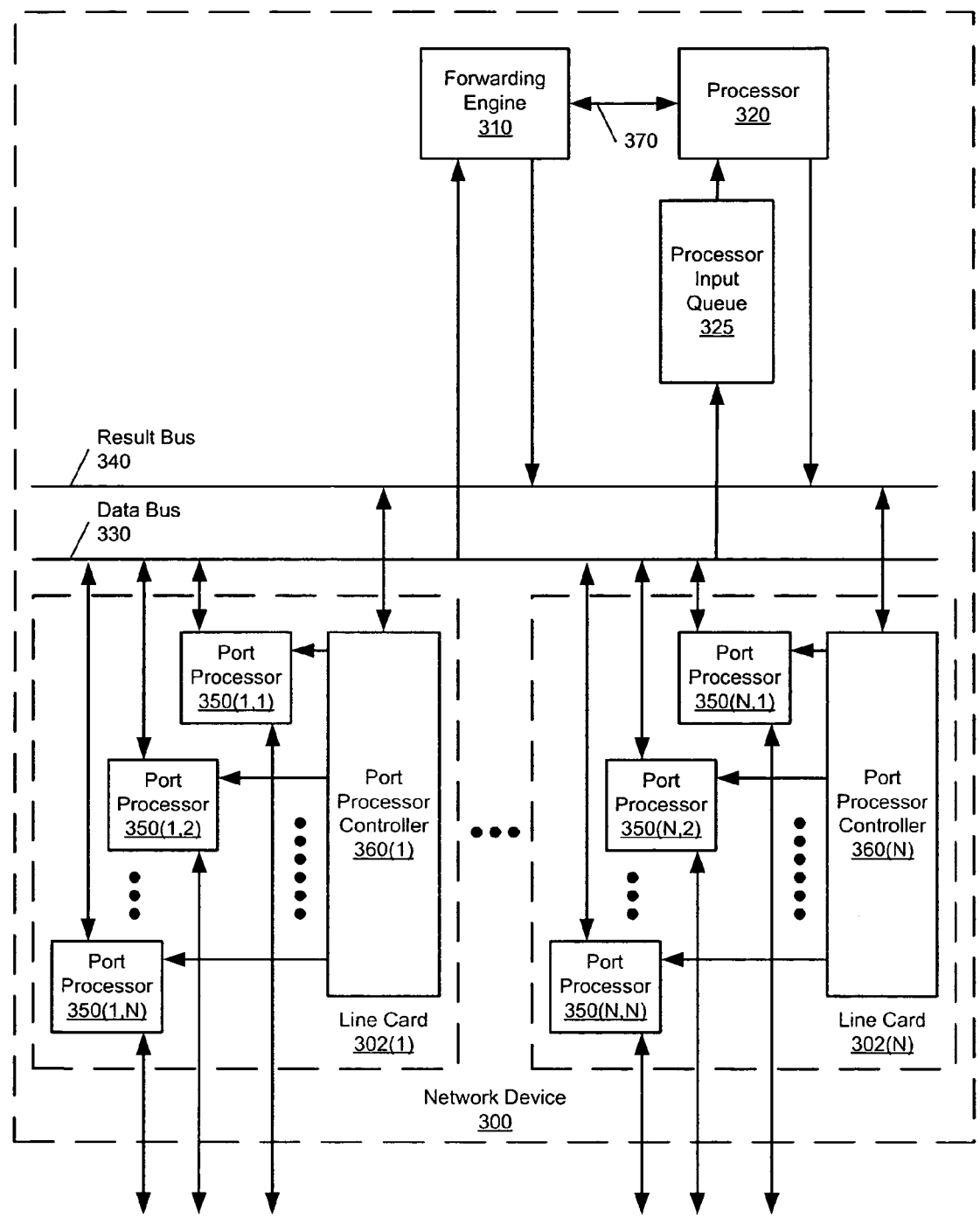
FIG. 3 is a block diagram illustrating a network communication node suitable for implementing embodiments of the present invention.
Figure 4:
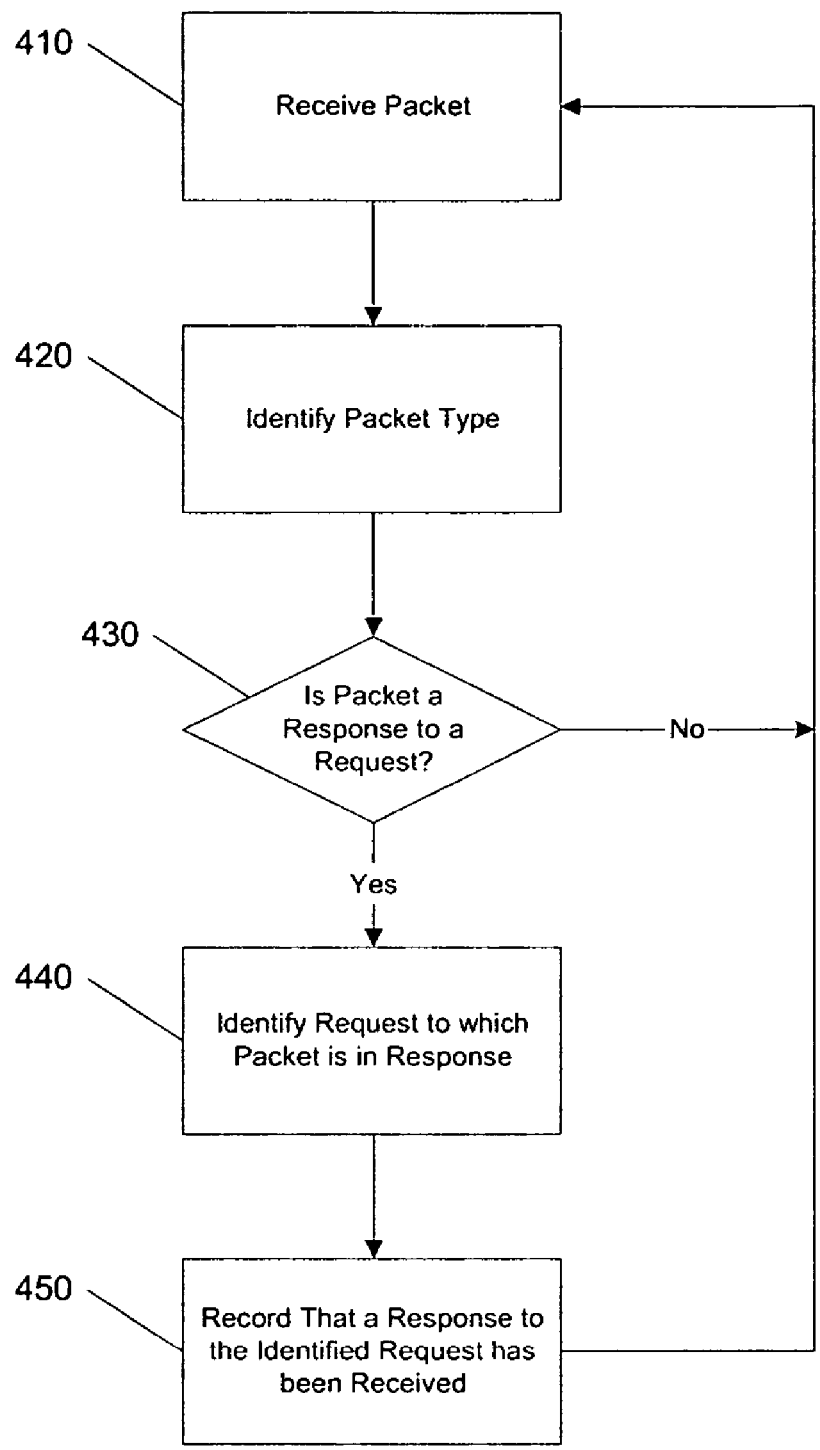
FIG. 4 is a simplified flow diagram illustrating a procedure for preprocessing incoming network packets in accord with one embodiment of the present invention.

FIG. 4 is a simplified flow diagram illustrating a procedure for preprocessing incoming network packets prior to insertion into a processor input queue (e.g., 325) in accord with one embodiment of the present invention. This preprocessor process can be performed by a processor 320 in a network communication node handling communication in a large network, as described above, or by an additional processor that can access incoming packets prior to insertion into the packet processor input queue. An incoming packet is received by the network communication node (410). Upon receiving the packet, a preprocessor process can analyze the packet to identify the type of packet (420). The identification step is performed to determine whether the packet is a response to a request packet (430). Such a step is desirable because a network communication node can receive packets representing a multitude of protocols and purposes. Responses can include acknowledgement, non-acknowledgement, rejection, and the like. In the case of PPP, code field 210 will identify the packet as one of an acknowledgement, non-acknowledgment, and rejection packet. If the packet is not in response to a request, the preprocessor can move on to the next packet received. If a packet is identified as a responsive packet, then the preprocessor can identify the request to which the responsive packet is in response (440). As an example, in PPP, the preprocessor can read identifier field 220 in order to determine the corresponding request packet. The preprocessor can then record that a response to the identified request has been received (450). Such a recordation can take the form of a flag associated with the identified request, or alternatively a list can be maintained of requests to which responses have been received. Other means of linking responses to identified requests can be performed within the scope of the present invention.

Once incoming responsive packets have been identified and linked to their corresponding request packets, a network communication node can use this information to suppress transmission of subsequent request packets associated with a particular link. Such suppression is described in connection with FIG. 5.

Figure 5:
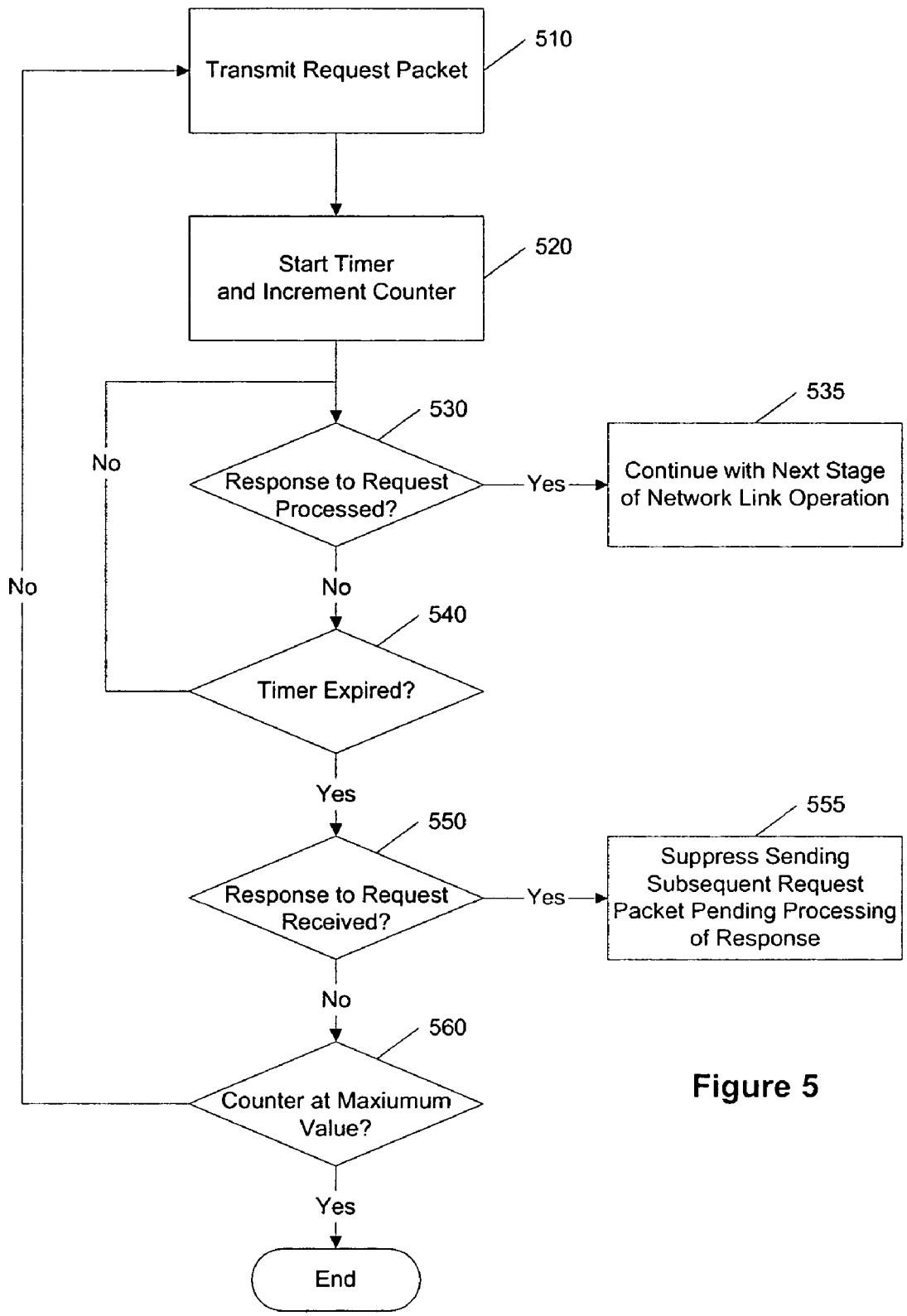
FIG. 5 is a simplified flow diagram illustrating a procedure for transmission suppression to be carried out by a network communication node in accord with one embodiment of the present invention.

FIG. 5 is a simplified flow diagram illustrating a procedure for transmission suppression to be carried out by a network communication node in accord with one embodiment of the present invention. The network communication node can transmit a request packet (510); such a request packet can be, for example, a PPP Configure-Request either in the context of LCP or NCP or a RADIUS Access-Request. At the time the request packet is transmitted, a timeout timer can be started (520). In addition, a retransmit counter can be incremented to track the number of request packet transmissions. If a response to the request packet is processed by the network communication node (530), then the network node can continue with the next stage of the network link operation (535). For example, if a PPP Configure-Ack to a Configure-Request is received, then the link can proceed to either authentication state (130) or network configuration state (140) (similar progression can occur if a RADIUS Access-Accept is received to an Access-Request). Should the timeout timer expire prior to processing a response to the request packet (540), then it is determined whether a response to the request packet has been received (550). At this step, the information gathered by a preprocessor (FIG. 4) can be used. Should a response to the request packet have been received but not yet processed, then the sending of a subsequent request packet is suppressed pending processing of the designated response packet. Such suppression can be done by, for example, resetting the response timer or turning off the response timer with regard to the corresponding request.

Suppressing transmission of a subsequent request associated with a link avoids the problem of making the received response packet stale due to the transmission of a request packet with a new identifier. Suppression of retransmits also decreases network traffic by preventing the transmission of both the subsequent request packet and a corresponding response packet. Suppression of transmission of a subsequent request packet may continue until the response packet is processed by the input processor and a determination is made whether a valid response has been received. Should the response packet not be valid, due to, for example, data corruption, a subsequent configuration request packet can be sent and a new timeout timer started.

If a response has not been received, then a determination is made as to whether the counter is at its maximum value (560), and if not, a new request packet is transmitted and the process repeats. Should the counter be at its maximum value, then the attempt to establish the link is discontinued. The originating node can be informed of the link failure, and steps can be taken to correct the network problem.

In the above discussion, examples have been given describing particular protocols and network communication nodes. The scope of the invention is not limited to the protocols described, but is applicable to any network protocol that utilizes a scheme of sending a packet to which a response is expected, and incorporating a timeout timer within which a response is expected. Further, such a procedure can be carried out on any network communication node, including but not limited to routers, network concentrators, and network access servers.

An Example Computing and Network Environment

As shown above, the present invention can be implemented using a variety of computer systems and networks. An example of one such computing and network environment is described below with reference to FIGS. 6 and 7.

Figure 6:
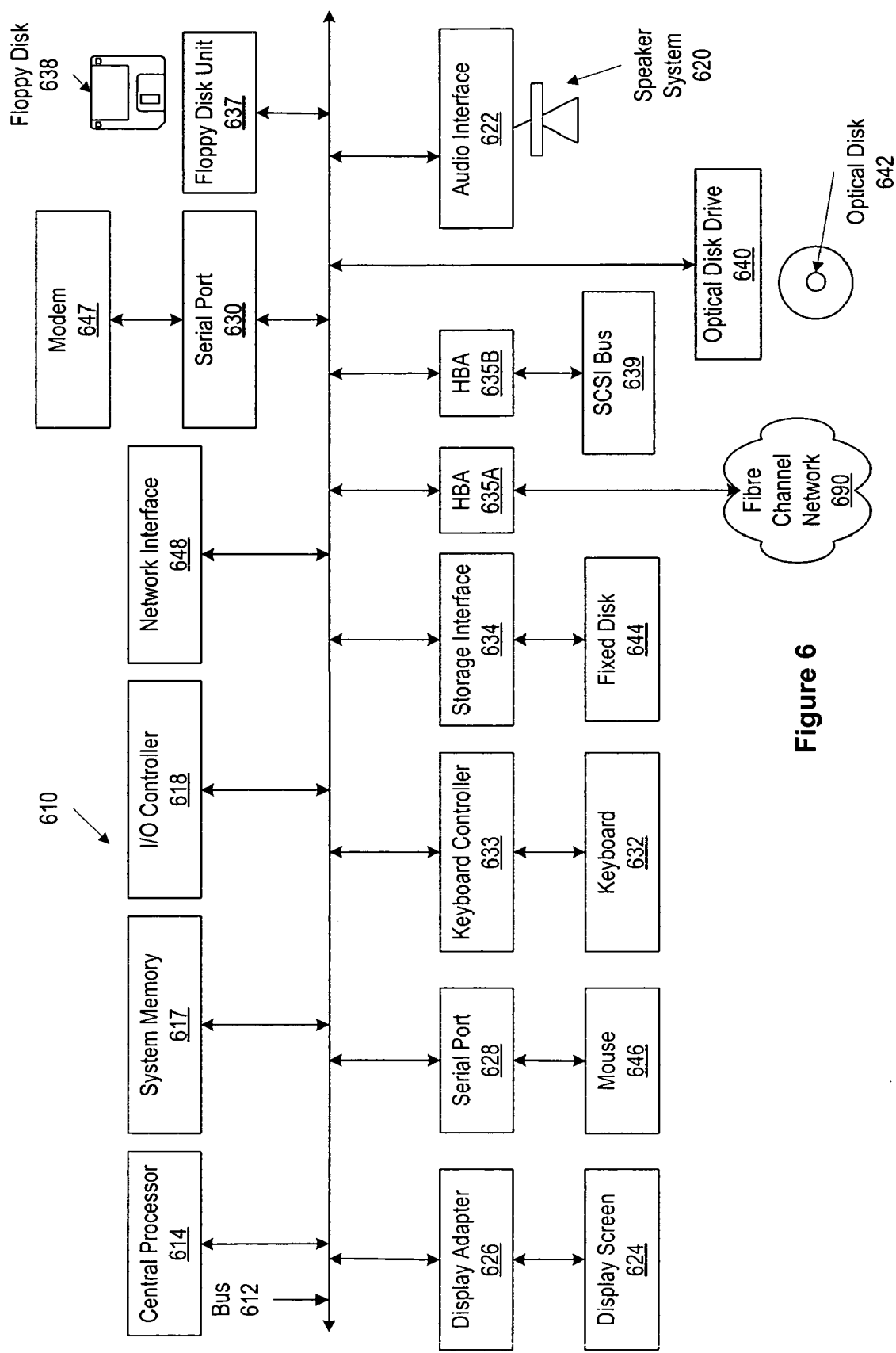
FIG. 6 is a block diagram of a computer system suitable for implementing embodiments of the present invention.

FIG. 6 depicts a block diagram of a computer system 610 suitable for implementing the present invention. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a fibre channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS), which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 6 need not be present to practice the present invention. The devices and subsystems can be interconnected in different ways from that shown in FIG. 6. The operation of a computer system such as that shown in FIG. 6 is readily known in the art and is not discussed in detail in this application. Code to implement the present invention can be stored in computer-readable storage media such as one or more of system memory 617, fixed disk 644, optical disk 642, or floppy disk 638. Additionally, computer system 610 can be any kind of computing device, and so includes personal data assistants (PDAs), network appliance, X-window terminal or other such computing devices. The operating system provided on computer system 610 may be MS-DOS®, MS-WINDOWS®, OS/2®, UNIX®, Linux®, or another known operating system. Computer system 610 also supports a number of Internet access tools, including, for example, an HTTP-compliant web browser having a JavaScript interpreter, such as Netscape Navigator®, Microsoft Internet Explorer®, and the like.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above-described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
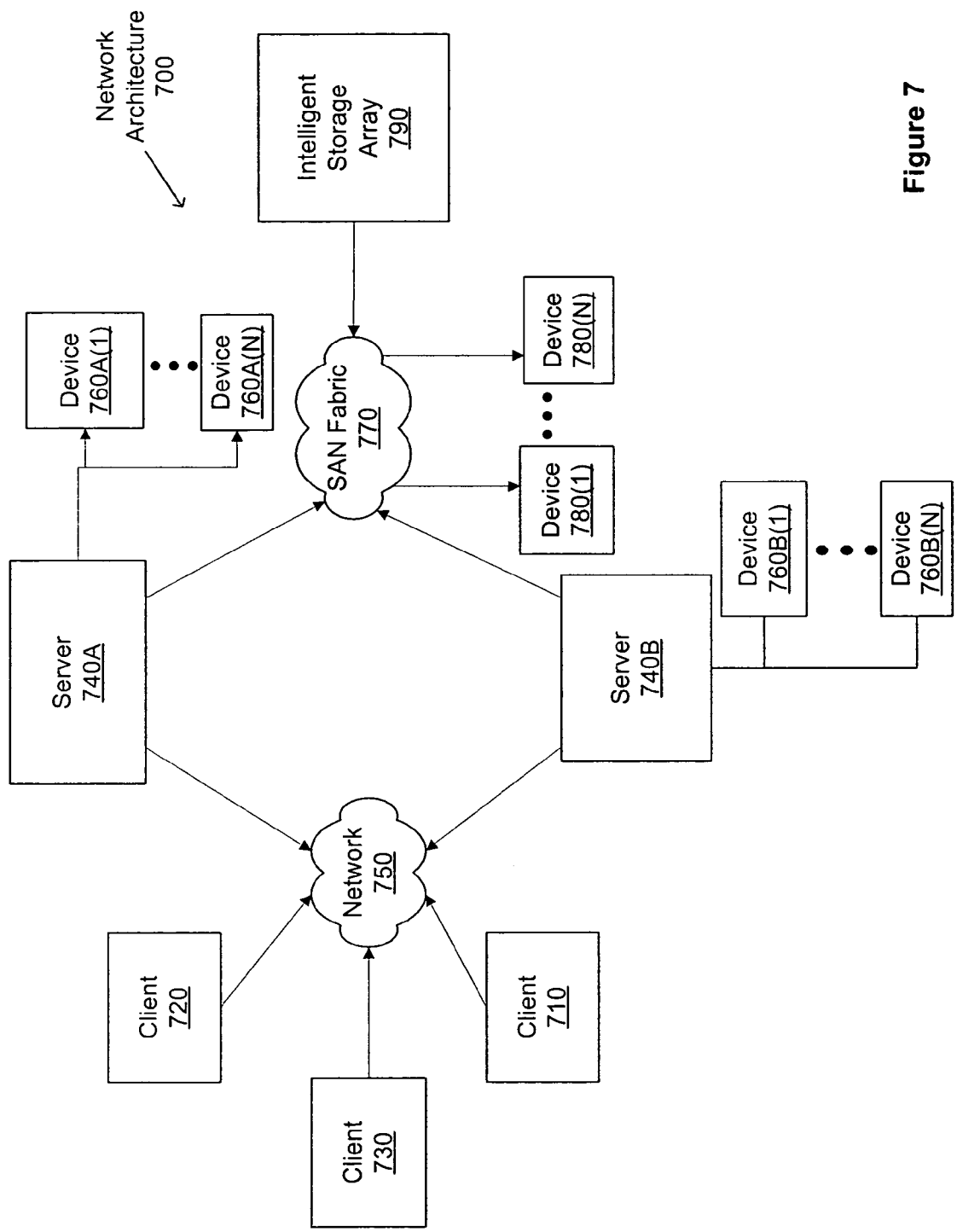
FIG. 7 is a block diagram depicting a network architecture suitable for implementing embodiments of the present invention.

FIG. 7 is a block diagram depicting a network architecture 700 in which client systems 710, 720 and 730, as well as storage servers 740A and 740B (any of which can be implemented using computer system 610), are coupled to a network 750. Storage server 740A is further depicted as having storage devices 760A(1)-(N) directly attached, and storage server 740B is depicted with storage devices 760B(1)-(N) directly attached. Storage servers 740A and 740B are also connected to a SAN fabric 770, although connection to a storage area network is not required for operation of the invention. SAN fabric 770 supports access to storage devices 780(1)-(N) by storage servers 740A and 740B, and so by client systems 710, 720 and 730 via network 750. SAN fabric 770 can include one or more switches configured to perform storage virtualization. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on storage server 740A or 740B using, for example, a web browser or other client software (not shown). Such a client allows client systems 710, 720 and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present invention is not limited to the Internet or any particular network-based environment.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 610). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   comparing a first identifier with a second identifier, wherein
   the first identifier is associated with a request packet,
   a response packet comprises the second identifier,
   the response packet is stored for packet processing, and
   the packet processing comprises determining whether the response packet is a valid response to the request packet; and
   suppressing a transmission of a subsequent request packet if said comparison indicates that said transmission should be suppressed, wherein
   the subsequent request packet comprises a retransmission of the request packet,
   the retransmission of the request packet comprises a third identifier in place of the first identifier,
   the transmission of the subsequent request packet would otherwise occur prior to the packet processing, in response to an expiration of a retransmit timer associated with the request packet, and
   said suppressing is performed prior to the packet processing determining whether the response packet is a valid response to the request packet.

2. The method of claim 1 further comprising:
   determining that the response packet is a response-type packet; and
   reading the second identifier.

3. The method of claim 2 wherein determining that the response packet is the response-type packet comprises:
   parsing a packet header of the response packet.

4. The method of claim 2 wherein reading the second identifier comprises:
   parsing a packet header of the response packet.

5. The method of claim 2 further comprising:
   receiving the response packet; and
   storing the response packet for the packet processing.

6. The method of claim 5 wherein storing the response packet for the packet processing comprises:
   entering the response packet in a processor queue, wherein the processor is configured for the packet processing.

7. The method of claim 1 further comprising:
   triggering the transmission of the subsequent request packet at the expiration of a timer.

8. The method of claim 1, wherein
   the request packet is a point-to-point protocol (PPP) packet; and
   the response packet is a PPP packet.

9. The method of claim 8, wherein
   the request packet is a link control protocol (LCP) packet; and
   the response packet is a LCP packet.

10. The method of claim 9, wherein
    the request packet is a Configure-Request packet; and
    the response packet is one of a Configure-Ack, a Configure-Nak, and a Configure-Rej.

11. The method of claim 9, wherein
    the request packet is a network control protocol (NCP) packet; and
    the response packet is a NCP packet.

12. The method of claim 1 further comprising:
    storing an indication corresponding to the first identifier if said comparison indicates that said transmission should be suppressed.

13. The method of claim 12 wherein said transmission should be suppressed if the first identifier is the same as the second identifier.

14. The method of claim 12 wherein the suppressing the transmission of the subsequent request packet occurs in response to the stored indication corresponding to the first identifier.

15. The method of claim 1, wherein said comparison indicates that said transmission should be suppressed by indicating that the response packet was transmitted by a remote node in response to the remote node receiving the request packet.

16. A network communication node comprising:
    a first port disposed for transmitting a request packet;
    a second port disposed for receiving a response packet;
    a queue, coupled to the second port, and configured to store the response packet;
    a processor, coupled to the queue and the first port, and configured to compare a first identifier with a second identifier, wherein
    the first identifier is associated with the request packet, and
    the response packet comprises the second identifier, and
    suppress a transmission of a subsequent request packet when the first identifier is the same as the second identifier, wherein
    the subsequent request packet comprises a retransmission of the request packet,
    the retransmission of the request packet comprises a third identifier in place of the first identifier,
    the transmission of the subsequent request packet would otherwise occur prior to packet processing of the response packet, in response to an expiration of a retransmit timer associated with the request packet,
    the packet processing comprises determining whether the response packet is a valid response to the request packet, and
    the suppressing is performed prior to the packet processing determining whether the response packet is a valid response to the request packet.

17. The network communication node of claim 16 wherein the processor is further configured to:
  determine that the response packet is a response-type packet; and
  read the second identifier.

18. The network communication node of claim 17 wherein determining that the response packet is the response-type packet comprises:
  parsing a packet header of the response packet.

19. The network communication node of claim 17 wherein reading the second identifier comprises:
  parsing the packet header of the response packet.

20. The network communication node of claim 16, wherein the processor is further configured to:
  trigger the transmission of the subsequent request packet at the expiration of a timer.

21. The network communication node of claim 16, wherein
  the request packet is a point-to-point protocol (PPP) packet; and
  the response packet is a PPP packet.

22. The network communication node of claim 21, wherein
  the request packet is a link control protocol (LCP) packet; and
  the response packet is a LCP packet.

23. The network communication node of claim 22, wherein
  the request packet is a Configure-Request packet; and
  the response packet is one of a Configure-Ack, a Configure-Nak, and a Configure-Rej.

24. The network communication node of claim 21, wherein
  the request packet is a network control protocol (NCP) packet; and
  the response packet is a NCP packet.

25. The network communication node of claim 16 wherein the processor is further configured to:
  generate an indication corresponding to the first identifier if said comparison indicates that said transmission should be suppressed.

26. The network communication node of claim 25 wherein said transmission should be suppressed if the first identifier is the same as the second identifier.

27. The network communication node of claim 25 further comprising:
  a memory, coupled to the processor, and configured to store the indication corresponding to the first identifier.

28. The network communication node of claim 27 wherein the suppressing the transmission of the subsequent request packet occurs in response to the stored indication corresponding to the first identifier.

29. An apparatus comprising:
  means for comparing a first identifier with a second identifier, wherein
    the first identifier is associated with a request packet,
    a response packet comprises the second identifier,
    the response packet is queued for processing, and
    the processing comprises determining whether the response packet is a valid response to the request packet; and
  means for suppressing a transmission of a subsequent request packet when the first identifier is the same as the second identifier, wherein
    the subsequent request packet comprises a retransmission of the request packet,
    the retransmission of the request packet comprises a third identifier in place of the first identifier,
    the transmission of the subsequent request packet would otherwise occur prior to the processing, in response to an expiration of a retransmit timer associated with the request packet, and
    said suppressing is performed prior to the processing determining whether the response packet is a valid response to the request packet.

30. The apparatus of claim 29 further comprising:
  means for determining that the response packet is a response-type packet; and
  means for reading the second identifier.

* * * * *